United States Patent [19]

Perrier et al.

[11] 4,067,689

[45] Jan. 10, 1978

[54] DIQUATERNARY AMMONIUM CELLULOSIC FABRICS WITH WRINKLE RESISTANT PROPERTIES

[75] Inventors: Dorothy M. Perrier; Ruth R. Benerito, both of New Orleans, La.

[73] Assignee: The United States of America as represented by the Secretary of Agriculture, Washington, D.C.

[21] Appl. No.: 728,104

[22] Filed: Sept. 30, 1976

Related U.S. Application Data

[63] Continuation-in-part of Ser. No. 446,439, Feb. 27, 1974, abandoned.

[51] Int. Cl.$^2$ .................... D06M 13/08; D06M 5/14; C08B 11/20; C08B 11/145
[52] U.S. Cl. .......................................... 8/129; 8/188; 536/50
[58] Field of Search ................................... 8/129, 188

[56] References Cited

U.S. PATENT DOCUMENTS

| 3,494,719 | 2/1970 | Soignet et al. ........................... 8/116 |
| 3,644,082 | 2/1972 | Berni et al. ............................... 8/188 |
| 3,652,540 | 3/1972 | Determann et al. ............. 260/232 A |
| 3,754,055 | 8/1973 | Rembaum ............................. 260/879 |

*Primary Examiner*—Harry Wong, Jr.
*Assistant Examiner*—Maria S. Tungol
*Attorney, Agent, or Firm*—M. Howard Silverstein; David G. McConnell; Salvador J. Cangemi

[57] ABSTRACT

Diethylaminoethyl (DEAE)-Cotton, prepared so that the tertiary amine nitrogens have unshared electrons and are thus in the Lewis-base form, is reacted with an alcoholic solution of an alpha-omega dihaloalkane to quaternize amino groups. The fabric produced by this process is crosslinked between tertiary amine nitrogen groups in cellulose and every alkylene group introduced is connected to two quaternary ammonium ions. The products of this process have strong base anion exchange properties and fabrics of high nitrogen content are imparted both wet and dry crease resistance.

11 Claims, No Drawings

DIQUATERNARY AMMONIUM CELLULOSIC FABRICS WITH WRINKLE RESISTANT PROPERTIES

CROSS-REFERENCES TO RELATED APPLICATION

This is a Continuation-in-Part of Ser. No. 446,439, now abandoned, filed February 27, 1974.

BACKGROUND OF THE INVENTION

1. Field of the Invention

This invention relates to chemical treatment of cellulosic textiles which impart wet and dry wrinkle resistance to cellulosic materials having anion exchange properties. More specifically, this invention relates to a process for the introduction of crosslinks between tertiary amine nitrogen groups in cellulose so that every resultant alkylene group introduced is connected to two quaternary ammonium ions. DEAE-Cotton is reacted with a non-aqueous solution containing an alpha-omega dihaloalkane in a precise manner to yield not only a product with strong-base anion exchange properties attributed to the diquaternary ammonium groups formed, but also a crease-resistant product which is good in both wet and dry conditions because the diquaternary cationic groups share a common alkylene group that crosslinks cellulose chains.

2. Description of the Prior Art

Berni, et al. (U.S. Pat. No. 3,644,082) teaches the preparation of anion exchange celluloses having isolated quaternary ammonium sites, that is, mono-quaternary ammonium cellulose anion exchangers. Prior art does not teach the simultaneous quaternization of two tertiary amine groups in a cellulose matrix with a common alkylene group that acts as a crosslink while also forming a diquaternary ammonium cellulose anion exchanger. Although the isolated quaternary ammonium groups of the prior art, that is, the monoquaternary ammonium group, impart strong-base anion exchange properties to the cellulose matrix as do the quaternary ammonium groups of the present invention, it is only with the latter groups, as explained in the present invention, that the cotton fabrics can be given wet and dry wrinkle recovery properties. It is also only with the crosslinked diquaternary compounds of the present invention that the fabrics of high nitrogen content (3% to about 4%) are insoluble in water and crease resistant.

SUMMARY OF THE INVENTION

The present invention consists of a product and the process for obtaining that product. The product is a diquaternary ammonium, fibrous, partial cellulose ether of the formula:

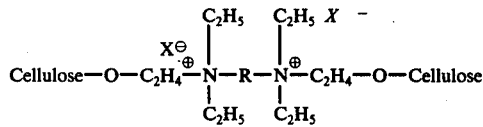

wherein R is an alkylene group having a chain length of from 5 to 10 carbon atoms and X⁻ is bromide, iodide, or chloride. The process consists of reacting freshly prepared diethylaminoethyl (DEAE)-Cotton, in which the tertiary amine nitrogens have unshared electrons and are thus in the Lewis base form, with an alcoholic solution of an alpha-omega dihaloalkane, in excess.

The main object of the present invention is to provide a process for preparing strong base cotton cellulose anion exchangers of high polyionic capacity that are insoluble in aqueous media.

Another object of the present invention is to provide the cellulosic derivatives, the fabrics, with crease resistance in both dry and wet states and with strong-base diquaternary ammonium groups as part of the crosslinks that impart crease resistance to the cellulose matrix.

DESCRIPTION OF THE PREFERRED EMBODIMENTS

1. Equation pertinent to the Present Invention

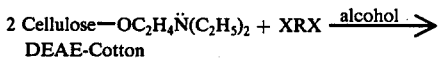

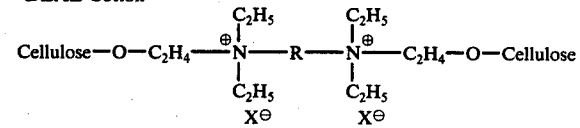

Note: As indicated before, R is an alkylene group having a chain length of from 5 to 10 carbon atoms and X⁻ is bromide, iodide, or chloride.

2. Specific Details of the Invention

In the present invention it is necessary to use anhydrous conditions and organic solvent that will not protonate free amine groups of DEAE-Cottons, thus assuring the presence of unshared pairs of electrons on the tertiary amine groups of DEAE-Cottons for reaction with the alpha-omega dihaloalkanes.

Diethylaminoethyl-Cotton was prepared under completely anhydrous conditions to insure that the amino groups are truly Lewis base groups, that is, that a pair of electrons is on each tertiary amine group. These DEAE-Cottons covered a range of nitrogen content of from 0.5% to 4.0%. These were reacted with an alcoholic solution of an alpha-omega dihaloalkane used in slight excess of the amount needed to quaternize all amino groups, preferably a molar ratio of tertiary DEAE-groups of the cotton to dihaloalkane of about 1:2, is used. Reaction was allowed to occur for several hours up to a maximum of 5 hours at reflux temperature of the alcohol being used. After the desired time, diquaternization was stppped by removing the fabric, washing in ethanol, then methanol. Fabrics thus treated were stored in methanol or dimethylformamide.

These diquaternary anion exchange cottons are quite different from the monoquaternary exchangers prepared by reacting DEAE-cottons with alkyl monohalides. In particular, only the diquaternaries prepared from alpha-omega dihaloalkanes and high nitrogen content DEAE-cottons have improved wet and dry wrinkle recoveries. When DEAE-cottons of nitrogen content of 3-4% are reacted with an alpha-omega dihaloalkane containing as little as 5 carbon atoms or as many as 10 carbon atoms, fabrics with wet and dry recovery angles approaching 300 (W+F)° are produced. Since these diquaternary exchange celluloses have potential use in purification of streams, in the preparation of pure fractions of drugs and biochemicals, it is important to note that the diquaternized ammonium cellulose exchangers are not soluble in water. The alpha-omega dihaloalkane decreases solubility of the cellulose in water because the alkylene group crosslinks cellulose chains as it forms the diquaternary groups. Thus, these diquaternary strong-base exchangers can be used where ordinarily prepared mono-quaternary ammonium base cellulose exchangers cannot because of their water solubilities. Presence of two positive sites separated by only 5 carbon atoms or 10 carbon atoms in the cellulose matrix impart unique characteristics to these exchangers particularly in their use for the separation or removal of divalent anions.

3. Evaluation of the Products Produced by the Process of this Invention

Degree of coversion of free amino groups of DEAE-Cotton to quaternary groups was determined by wet chemical analyses, potentiometrically by acid-base titration curves, and by use of electron-emission spectroscopy of fabrics or ground fabrics to detect amounts of $NR_3+H$ and $NR_4+$ present. Degree of crosslinks was also indicated by amounts of increase in dry and wet wrinkle resistance as determined by wrinkle recovery methods (ASTM D1295-67).

The following examples are provided to illustrate certain embodiments of the present invention and should not be construed as limiting the invention in any manner.

EXAMPLE 1

Samples of desized, scoured, and bleached cotton fabric (80×80 thread count) weighing approximately 20 grams each were converted in nonaqueous media to sodium cellulosates and then to DEAE-Cotton as described in "Preparation of DEAE-cotton Fabrics" by D. M. Soignet and R. R. Benerito, pp 1001-03, Textile Research Journal, Vol. 37, 1967). Exerpimental conditions were selected to give DEAE fabrics having a range of nitrogen contents from a minimum of 0.5% to a maximum of 4.0% . Wet wrinkle recovery increased with nitrogen content from a minimum of 189° at 0.5%N to 225° (W+F) at 4.0%N. In contrast, dry wrinkle recovery decreased from the range of 183° to 155° at 1%N to 120° (W+F) at 4.0%N. All DEAE-cottons were stored under nitrogen in tertiary butanol to assure that all tertiary amine groups remained unprotonated until the selected diahaloalkanes were added.

EXAMPLE 2

A 20 gram sample of DEAE-cotton of 0.5%N, as prepared in Example 1, was refluxed for 5 hours in an ehtnaolic solution of 20% 1,5-diiodopentane. Fabric was then removed, washed with absolute methanol, and air dried before analyses were made. Wet chemical analyses showed all iodine was present as iodide ion and indicated 100% conversion to the quaternary iodide as 0.42 megs/g of iodide to 0.38 megs/g of nitrogen were present. Potentiometric titration curves showed presence of only quaternary ammonium strong-base groups. At this low nitrogen content, there was no significant increase in dry recovery, the value obtained being 190° (W+F) and a wet decrease in wet recovery to 157° (W+F). Fabrics were insoluble in water.

EXAMPLE 3

Another portion of DEAE-cotton of 0.5%N as used in Example 2, was treated according to procedure of Example 2 except that 1,5-dibromopentane was employed as the diquaternizing reagent. The resultant fabric contained 2.2% bromide or a 66% conversion to the diquaternary cellulose exchanger. Final fabrics were insoluble in water; wet recovery was only 145° (W+F) and dry recovery was equivalent to that of the original DEAE-cotton, 183° (W+F).

EXAMPLE 4

Another portion of DEAE-cotton of 0.5% N was used and treated as in Example 2 except that 1,5-dichloropentane was the diquaternizing reagent. The resultant fabric contained 1.1% chloride and indicated a 75% conversion to the diquaternary cellulose exchanger. As with the diiodo- and dibromo- pentanes, fabrics were insoluble in water; wet wrinkle recovery was significantly reduced below that of the original DEAE-cotton 125° (W+F), but dry wrinkle recovery was essentially unchanged, 187° (W+F).

Note: The following examples illustrate the importance of using a DEAE-cotton of a high degree of substitution with respect to nitrogen if dry and wet recovery are desired in the final fabric along with high capacity diquaternary anion exchange properties.

EXAMPLE 5

A DEAE-cotton of 3.57% nitrogen content rather than the 0.5% nitrogen content used in Examples 1-4 was treated with the same chemicals and by the same procedure followed as in Example 2. Wet elemental analyses showed a 3.5% nitrogen and a 20.5% iodide content or a 57% conversion to the diquaternary iodide. Wet wrinkle recovery had increased to 305° (W+F) and the dry wrinkle recovery angles were increased to 280° (W+F), assuring fabrics with wrinkle resistance in both the wet and dry states. Fabrics were insoluble in water in spite of the high degree of substitution.

EXAMPLE 6

A sample of DEAE-cotton of 3.5% nitrogen rather than 0.5% nitrogen content was treated with the same chemicals and by the same procedure as described in Example 3. Wet elemental analyses showed a 6.04% bromide indicating a 41% conversion to the diquaternary bromide. Wet and dry wrinkle recoveries increased to 301° and 294° (W+F) respectively, assuring the fabric with wrinkle resistance in both the wet and dry states. Fabrics of this high degree of substitution were insoluble in water.

Note: The following examples are used to illustrate that mere 20% conversion to a diquaternary of a DEAE-cotton of high nitrogen content does not result in final products with high wet and dry wrinkle recoveries.

EXAMPLE 7

A sample of DEAE-cotton of 3.5% nitrogen rather than 0.5% nitrogen content was treated with the same chemicals and by the same procedure as described in Example 4. Wet elemental analyses showed a 1.79% chloride indicating only a 22% conversion to diquaternary. Wet wrinkle recovery of the final fabric had increased to only 222° (W+F) and dry recovery had increased only slightly, to 164° (W+F), thus indicating the requirement of a greater number of crosslinks than 20% diquaternization for wrinkle resistant fabrics.

EXAMPLE 8

A sample of DEAE-cotton identical to that used in Example 7 was treated according to the procedure of Example 7, except that 1,10-dichlorodecane was used in place of the 1,5-dichloropentane. The final fabric of 1.7% chloride indicated a 21% conversion to the diquaternary. The fabric was too swoolen to measure its wet wrinkle recovery angles, but the dry recovery angle was only 122° (W+F), equivalent to that of the original DEAE-cotton.

Note: The following examples are provided to illustrate that DEAE-cottons of high nitrogen content can be given wrinkle recovery in both wet and dry states when crosslinked via diquaternization of two tertiary amine groups by an alkyl group of at least 10 carbon atoms.

EXAMPLE 9

A DEAE-cotton sample identical to that used in Example 5 was treated by exactly the same procedure as described in Example 5, except that 1,10-diiododecane was used in place of the 1,5-diiodopentane. Use of the longer chain $C_{10}$ crosslinker resulted in a final product containing 14.57% iodide indicating a 63% conversion to the diquaternary and with wet and dry recovery angles of 316° and 241° (W+F), respectively.

EXAMPLE 10

A DEAE-cotton sample identical to that used in Example 6 was treated by exactly the same procedure as described in Example 6, except that 1,10-dibromodecane was used in place of the 1,5-dibromopentane. Use of the longer chain $C_{10}$ crosslinker resulted in a final product containing 11.0% bromide indicating a 54% conversion to the diquaternary. Wet recovery angles were too high to measure accurately and dry recovery angles were 260° (W+F), thus assuring a final product with high dry and wet wrinkle resistance.

Note: The following examples are provided to illustrate that even high degrees of diquaternization of a DEAE-cotton of low nitrogen content do not result in crease resistant cottons, and that a DEAE-cotton of high nitrogen (ca. 4%N) is needed even with a long chain alkyl group to form crease resistant cottons in wet and dry states.

EXAMPLE 11

A DEAE-cotton sample identical to that used in Example 2 was treated by exactly the same procedure as described in Example 2, except that 1,10-diiododecane was used in place of the shorter chain 1,5-diiodopentane. Use of the longer $C_{10}$ crosslinker resulted in a final product containing 4.1% iodide indicating a 77% conversion to the diquaternary ammonium cellulose exchanger. The final fabric showed no significant improvement in dry recovery being 192° (W+F) and a decrease in wet recovery to 152° (W+F). Potentiometric titration curves indicated a presence of diquaternary groups.

EXAMPLE 12

A DEAE-cotton sample identical to that used in Example 3 was treated by exactly the same procedure as described in Example 3, except that 1,10-dibromodecane was used in place of the shorter chain 1,5-dibromopentane. Use of the longer $C_{10}$ crosslinker resulted in a final product containing 2.4% bromide indicating 82% conversion to diquaternary ammonium cellulose exchanger. The final fabric showed wet and dry recovery angles of 155° and 172° (W+F), respectively, which are values less than the DEAE-cotton values.

EXAMPLE 13

A DEAE-cotton sample identical to that used in Example 4 was treated by exactly the same procedure as described in Example 4 except that 1,10-dichlorodecane was used in place of the shorter chain 1,5-dichloropentane. Use of the longer chain $C_{10}$ crosslinker resulted in a final product containing 0.5% chloride indicating a 34% conversion to a diquaternary ammonium cellulose exchanger. Dry recovery angles of 188° (W+F) were essentially like that of the original DEAE-cotton and wet recovery angles were reduced to 165° (W+F).

EXAMPLE 14

A DEAE-cotton sample identical to that used in Example 4 was treated by exactly the same procedure as described in Example 4, except that 1,6-dichlorohexane was used in place of 1,5-dichlorpentane. The final product containing .64% chloride, indicating 48% conversion to a diquaternary ammonium cellulose exchanger. It was insoluble in water. Dry recovery angles were only 177° (W+F) and wet recovery was reduced to 140° (W+F).

We claim:

1. A process for producing diquaternary ammonium partial cellulose fibrous ethers, the process comprising reacting tertiary DEAE-cotton ether having a nitrogen content of about from 3.5% to 4.0% and in which the tertiary amine nitrogens have unshared electrons and are thus in the Lewis base form with an alpha-omega dihaloalkane of chain length $C_5$ to $C_{10}$ in organic solvent solution to yield a cotton derivative having substantially for every alkylene group added two amino groups of the original DEAE-cotton changed to diquaternary crosslinks.

2. A process for producing a fibrous diquaternary ammonium cellulose fabric with ion exchange properties, insoluble in water, and having wrinkle resistant properties in both wet and dry states, the process comprising:
   a. reacting tertiary DEAE-cotton ether fabric of about 4% nitrogen content, and in which the tertiary amine nitrogens have unshared electrons and are in the Lewis base form, with a 20% alcoholic solution containing a quantity of alpha-omega dihaloalkane, wherein the moles of alpha-omega dihaloalkane to available tertiary DEAE sites are in excess, and the alpha-omega dihaloalkane is selected from the group consisting of diiodoalkanes, dibromoalkanes, and dichloroalkanes having a chain length of from $C_5$ to $C_{10}$, to yield a cotton derivative having substantially for every alkylene group added two amino groups of the original DEAE-cotton changed to diquaternary crosslinks and
   b. washing the fibrous quaternary product thus produced, with absolute methanol or ethanol at room temperature to remove all unreacted substances.

3. The process of claim 2 wherein the alcoholic solution is ethanolic.

4. The process of claim 2 wherein the alpha-omega dihaloalkane is 1,5-diiodopentane.

5. The process of claim 2 wherein the alpha-omega dihaloalkane is 1,5-dibromopentane.

6. The process of claim 2 wherein the alpha-omega dihaloalkane is 1,5-dichloropentane.

7. The process of claim 2 wherein the alpha-omega dihaloalkane is 1,6-dichlorohexane.

8. The process of claim 2 wherein the alpha-omega dihaloalkane is 1,10-diiododecane.

9. The process of claim 2 wherein the alpha-omega dihaloalkane is 1,10-dibromodecane.

10. The process of claim 2 wherein the alpha-omega dihaloalkane is 1,10-dichlorodecane.

11. The process of claim 2 wherein the molar ratio of tertiary DEAE-groups of the cotton to dihaloalkane is about 1:2.

* * * * *